(12) United States Patent
Miller et al.

(10) Patent No.: US 7,921,003 B2
(45) Date of Patent: Apr. 5, 2011

(54) SYSTEM AND METHOD FOR SIMULATING SHALLOW WATER EFFECTS ON ARBITRARY SURFACES

(75) Inventors: Gavin S. P. Miller, Los Altos, CA (US); Huamin Wang, Atlanta, GA (US)

(73) Assignee: Adobe Systems Incorporated, San Jose, CA (US)

( * ) Notice: Subject to any disclaimer, the term of this patent is extended or adjusted under 35 U.S.C. 154(b) by 531 days.

(21) Appl. No.: 12/017,719

(22) Filed: Jan. 22, 2008

(65) Prior Publication Data

US 2008/0177519 A1 Jul. 24, 2008

Related U.S. Application Data

(60) Provisional application No. 60/886,238, filed on Jan. 23, 2007.

(51) Int. Cl.
*G06F 9/455* (2006.01)

(52) U.S. Cl. .......................................................... 703/9

(58) Field of Classification Search ................. 703/9, 2, 703/10, 6; 405/79; 715/784
See application file for complete search history.

(56) References Cited

U.S. PATENT DOCUMENTS

| | | | | |
|---|---|---|---|---|
| 5,564,859 | A * | 10/1996 | Lochtefeld | 405/79 |
| 6,198,489 | B1 * | 3/2001 | Salesin et al. | 715/784 |
| RE39,171 | E * | 7/2006 | Lochtefeld | 405/79 |
| 2003/0110018 | A1 * | 6/2003 | Dutta et al. | 703/10 |
| 2004/0167757 | A1 * | 8/2004 | Struijs | 703/2 |
| 2007/0239414 | A1 * | 10/2007 | Song et al. | 703/9 |

OTHER PUBLICATIONS

Kass et al., "Rapid, stable fluid dynamics for computer graphics", ACM, 1990.*
Schneider et al., "Towards real-time visual simulation of water surfaces", Aachen University of Technology, 2001.*
Wang et al., "Water drops on surfaces", ACM 2005.*
O'Brien et al. "Dynamic simulation of splashing fluids", IEEE, 1995.*
Kass et al. "An introduction to Continuum dynamics for computer graphics", SIGGraph, 1995.*
Foster et al., "Practical animation of liquids", ACM 2001.*
Enright et al., "Animation and rendering of complex water surfaces", ACM 2002.*
Wang et al., "Solving general shallow wave equations on surfaces", ACM 2007.*

(Continued)

*Primary Examiner* — Paul L Rodriguez
*Assistant Examiner* — Kandasamy Thangavelu
(74) *Attorney, Agent, or Firm* — Robert C. Kowert; Meyertons, Hood, Kivlin, Kowert & Goetzel, P.C.

(57) ABSTRACT

A system and method for shallow water simulation may provide a framework for solving General Shallow Wave Equations (GSWE) to efficiently simulate 3D fluid effects on arbitrary surfaces using a height field representation. The height field representation may include height columns constructed along surface normals, which may be dependent on a condition of boundary cells adjacent to fluid cells and/or artificial viscosity effects. The framework may provide implicit schemes for solving for the effects of external forces applied to the fluid, including gravity and surface tension, and explicit schemes for solving for advection effects. The system and method may be implemented on general-purpose CPU(s) and/or GPU(s) and may be capable of simulating a variety of fluid effects including: waves, rivulets and streams, drops, and capillary events. In some embodiments, the system and method may achieve real-time fluid control and fluid shape design through user-interaction (e.g., in a graphical painting application).

30 Claims, 7 Drawing Sheets

OTHER PUBLICATIONS

Miklos, B., "Real-time fluid simulation using height fields", Swiss Federal institute of Technology, 2004.*

Baxter et al., "A viscous paint model for interactive applications", Computer animation and virtual world, 2004.*

Iglesias, A., "Computer graphics techniques for realistic modeling, rendering and animation of water, Part I: 1980-1988", ICCS 2002.*

Iglesias, A., "Computer graphics for water modeling and rendering: a survey", Future generation computer systems, 2004.*

Klein et al., "Simulation, modeling and rendering of incompressible fluids in real time", University of Stuttgart, Germany, 2003.*

Loset T.K., "Real-time simulation ad visualization of large sea surfaces" Norwegian University of Science and Technology, 2007.*

Tessendorf, J., "Simulating Ocean water", 2004.*

Foster et al., "Controlling fluid animation", IEEE 1997.*

Layton, et al., "A Numerically Efficient and Stable Algorithm for Animating Water Waves," VIsual Computer Springer-Verlag, vol. 18, No. 1, Feb. 2002, pp. 41-53.

Nelson, et al., "Height-Field Fluids for Computer Graphics," Simulation Conferrence, 1991, Proceedings, IEEE, Dec. 8, 1991, pp. 1194-1198.

Hegeman, et al., "Particle-Based Fluid Simulation on the GPU," Computational Science—ICCS 2006 Lecture Notes in Computer Science, vol. 3994, Jan. 1, 2006, pp. 228-235.

International Search Report for PCT/US2008/051683, mailed Jun. 10, 2008.

Kass, M., and Miller, G., "Rapid, Stable Fluid Dynamics for Computer Graphics" Proc. of ACM SIGGRAPH, vol. 24, No. 4, 1990, 9 pages.

O'Brien, J. F., and Hodgins, J. K., "Dynamic Simulation of Splashing Fluids" Computer Animation 1995, 198-205.

Wang, H., Mucha, P. J., and Turk, G., "Water Drops on Surfaces" Proc. of ACM SIGGRAPH 2005, 921-929.

Irving, G., Guendelman, E., Losasso, F., and Fedkiw, R., "Efficient Simulation of Large Bodies of Water by Coupling Two and Three Dimensional Techniques" Proc. of ACM SIGGRAPH 2006, 7 pages.

* cited by examiner

SYSTEM AND METHOD FOR SIMULATING SHALLOW WATER EFFECTS ON ARBITRARY SURFACES

This application claims benefit of U.S. Provisional patent application No. 60/886,238 filed Jan. 23, 2007.

BACKGROUND

1. Field of the Invention

The present invention is directed to computer systems. More particularly, it is directed to image processing.

2. Description of the Related Art

Water is crucial to human life. People see, use and drink water every day, thus it is not surprising that water simulation plays an important role in computer graphics. Incompressible fluid dynamics, including water movement, in general can be described by the Navier-Stokes equations. These complex differential equations describe the motion of fluids in terms of the relationships among the rates of change of certain variables of interest (e.g., gravity, pressure, viscous forces). The solution to the equations indicates not position, but velocity, (e.g., a velocity field or flow field), from which other properties may be derived (e.g., path, flow rate, drag). Graphics researchers have invented and adopted many numerical methods to generate various realistic water effects by solving the Navier-Stokes equations ever since water animation was introduced into the graphics community during the 1980's. Most previous research has been focused on simulating the high-speed dynamics of large bodies of water. However, providing a fast and accurate technique to simulate small-scale fluid dynamics (e.g., relatively calm water) and its interaction with solid surfaces, such as toy boats floating in a bathtub and water drops streaming down a glass, has not been adequately addressed. Previous height-field-based techniques only supported a limited range of effects. In particular surface tension forces were neglected. This omission diminished the accuracy of small-scale liquid simulations, in which surface tension may be a dominant force affecting the shape of the liquid.

Water animation is notoriously difficult and time-consuming to produce because solving three-dimensional (3D) Navier-Stokes equations requires a huge computational domain. Traditionally, two basic approaches to simulating fluid dynamics have been applied: a Euclidean approach (in which fluid motion is solved with respect to a fixed grid), and a Lagrangian approach (in which particle advection is computed and the fluid is reconstructed according to the physics of the particles). Both memory and computational costs increase at least cubically in three dimensions when water is represented either by particle systems or 3D grid systems. To improve simulation performance, some prior techniques have attempted to reduce the computational space. For example, instead of using completely uniform grids in 3D, the use of non-uniform grids, such as octree structures or cells with various lengths, has been proposed. Others have considered solving fluid dynamics on unstructured tetrahedral meshes rather than grid structures. Principal Component Analysis (PCA) has been used to further reduce a static computational space. However, it is difficult to extend this method to free surface water animations.

Height fields have been introduced to the graphics community for rapid fluid simulations. For a description of the use of height fields, see, e.g., Kass, M., and Miller, G., "Rapid, Stable Fluid Dynamics for Computer Graphics" Proc. of ACM SIGGRAPH 1990 (hereinafter "*Kass and Miller* 1990"), which is herein incorporated by reference in its entirety. The method described therein for animating water is based on an approximation to the shallow water equations that involves a version of the wave equation on a height field in which the wave velocity is proportional to the square root of the depth of the water. The resulting wave equation is then solved using an alternating-direction implicit method on a uniform finite-difference grid.

The computational domain of a height-field-based system increases only quadratically with the spatial resolution. This technique was later augmented with semi-Lagrangian velocity advection. In general, advection refers to transport in a fluid, and simulations of advection typically look back along the velocity vector of the fluid at a point of interest to determine what will arrive at the point of interest in the future. For example, see Layton, A. T., and Van de Panne, M., "A Numerically Efficient and Stable Algorithm for Animating Water Waves" The Visual Computer (2002) 18:41-53, which is herein incorporated by reference in its entirety. The algorithm described therein is based on two-dimensional (2D) shallow water equations integrated using an implicit semi-Lagrangian scheme that allows large time steps while maintaining stability.

Instead of using shallow wave equations, some researchers have proposed to solve pressure projection only in two dimensions, while solving other simulation steps in three dimensions. Techniques to combine a height field representation with a grid structure in order to simulate some non-height-field behaviors, such as overturning and splashing, have also been demonstrated. As mentioned above, previous height-field-based techniques only supported a limited range of effects.

In order to simulate two-dimensional water flows on curved surfaces, the use of quadrilateral meshes from Catmull-Clark subdivision has been proposed. Flow simulation directly on manifold triangle meshes has been demonstrated using discrete differential geometry (DDG) operators. The "Back and Forth Error Compensation and Correction" (BFECC) method has been further adopted to reduce numerical dissipation in surface flows.

Other related topics include water wave simulation, height-field-based painting systems, fluid surface tension (and its contact angle), highly viscous liquids and viscoelastic liquids, and fluid control.

SUMMARY

A system and method for shallow water simulation may provide a framework for solving General Shallow Wave Equations (GSWE) to efficiently simulate 3D water flows on arbitrary surfaces using a height field representation. The framework may provide implicit schemes for solving for the effect of external forces applied to water, including gravity and surface tension. Water flows in this system may be simulated not only on flat surfaces by using regular grids, but may also be simulated on curved surfaces. The system and method may be implemented on one or more general-purpose central processing units (CPUs) and/or graphics processing units (GPUs), in different embodiments. The system and method may be capable of simulating a variety of water effects including: water waves, rivulets and streams, water drops, and capillary events. In some embodiments, the system and method may facilitate real-time fluid control and shape design that may be controlled through user interaction in a graphics application.

Compared with other representations, such as particles, tetrahedral meshes or grid structures, a height field representation may be a more suitable choice for representing small-scale water in low-speed fluid animations. A 2.5D heightfield-based system may be provided which, in some embodiments, may be easier to implement than other representations. In addition, the cost of such a system may increase only quadratically with linear spatial resolution. The system and method described herein may include restricting the Navier-Stokes equations to 2D for applying implicit numerical schemes, which may provide for more stability and higher efficiency than previous techniques, in some embodiments. As used herein, the term "stability" generally refers to the tendency of an algorithm to converge (e.g., keeping errors within defined boundaries). Typically, implicit schemes are much more stable than explicit schemes and may allow for larger time steps, but may introduce more errors than explicit schemes.

A general height-field-based system may be provided that solves new General Shallow Wave Equations (GSWE) extended from traditional shallow wave equations. The system may build height columns along surface normals rather than in the absolute gravity direction. External forces simulated in the system may include gravity and surface tension. In some embodiments, such external forces may be solved by implicit schemes that may be more stable and efficient than explicit schemes. The system and method may run in real time on either general-purpose CPUs and/or GPUs, in various embodiments, and may allow users to control and design fluid shapes interactively. The system and method may accommodate simulation of water flow on surfaces with arbitrary topology, in some embodiments.

The system and method described herein may be suitable for simulating low-speed fluid dynamics of small-scale 3D water flows on surfaces, which may be otherwise expensive to simulate using particle systems or grid systems. It may also provide an efficient way to predict high-speed dynamics behaviors before applying more accurate but also more time-consuming and/or resource intensive techniques.

In one embodiment, a comprehensive system that combines height-field-based systems with particle systems and grid systems is provided. For a description of particle systems, see, e.g., O'Brien, J. F., and Hodgins, J. K., "Dynamic Simulation of Splashing Fluids" Computer *Animation* 1995, 198-205, which is hereby incorporated by reference in its entirety. For a description of grid systems, see, e.g., Irving, G., Guendelman, E., Losasso, F., and Fedkiw, R., "Efficient Simulation of Large Bodies of Water by Coupling Two and Three Dimensional Techniques" *Proc. of ACM SIGGRAPH 2006*, which is hereby incorporated by reference in its entirety.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

General Shallow Wave Equations

Water behavior may be drastically different depending on the scale. For example, the effects of gravity largely dominate large-scale water phenomena. However, small-scale water behavior may be dominated by surface tension or other forces. These forces may affect both wave velocity with respect to frequency and shape form in equilibrium. For example, large-scale liquid equilibrium shapes may be flat, whereas small-scale equilibrium shapes may form droplets of high curvature. Simulating fluid motion in a manner that takes surface tension effects into account may result in more natural-looking water effects than those possible in simulators that do not include them. A system and method that includes these effects efficiently may be efficient enough to render realistic looking shallow water effects in real time, in some embodiments.

Figure 1:
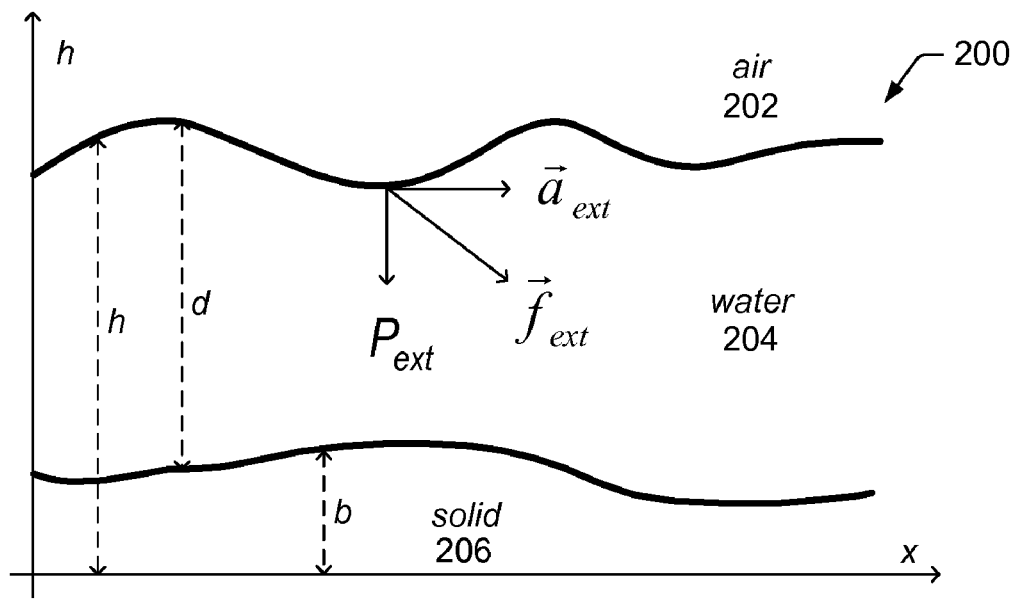
FIG. 1 illustrates a shallow water wave, which may be simulated using various embodiments of the system and methods described herein.

A shallow water simulation system and method is provided that extends traditional Shallow Wave Equations (SWE) to new General Shallow Wave Equations (GSWE). The General Shallow Wave Equations are extended to include a lateral acceleration term solved by advection, and a pressure and surface tension term solved using an implicit solver. These extensions may in various embodiments allow surface tension and spatially varying control and gravity forces to be simulated efficiently. As their names imply, SWE and GSWE are both based on the shallow wave assumptions: the wave velocity is low and the wave height variation is small. FIG. 1 illustrates one example of a shallow wave 200 flowing over a solid surface. In this example, the depth of wave 200 at a given position and time (i.e., the distance between the surface of solid 206 and the surface of water 204) is indicated by d. In this example, the height of wave 200 (i.e., the distance between the "bottom" of solid 206 and the surface of water 204) at a given position and time is indicated by h, and the height of the terrain over which wave 200 flows (i.e., the height of solid 206) at a given position and time is indicated as b.

Figure 2A:
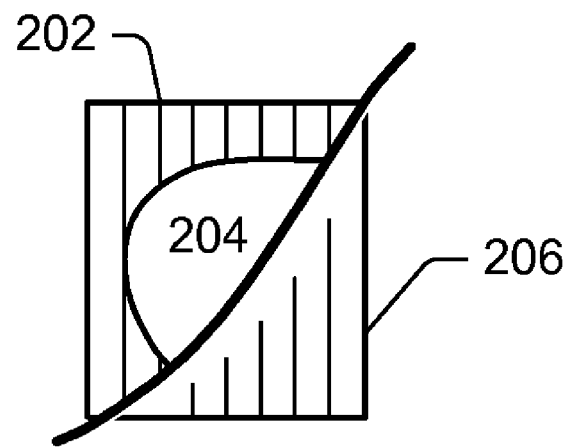
FIGS. 2A and 2B illustrate two-dimensional representations of a height field constructed normal to a gravity direction and a height field constructed normal to a surface, respectively.

Using traditional SWE methods, a height field was built in the absolute gravity direction and the only external force considered was the force of gravity in the horizontal direction. While SWE systems could be greatly simplified because of these constraints, they suffered from the following limitations. First, solid surfaces could not be too steep otherwise water drops would not be properly represented. This is illustrated by the example shown in FIG. 2A, in which a water drop 204 sits on a solid 206, and the height field is built in the gravity direction. Second, such systems did not allow for incorporation of arbitrary external forces, such as surface tension forces and user controlled forces, nor was it clear how such forces could be solved using implicit schemes. Interaction between height-field-based water and the environment was also difficult to model in a physically based manner using SWE.

Figure 2B:
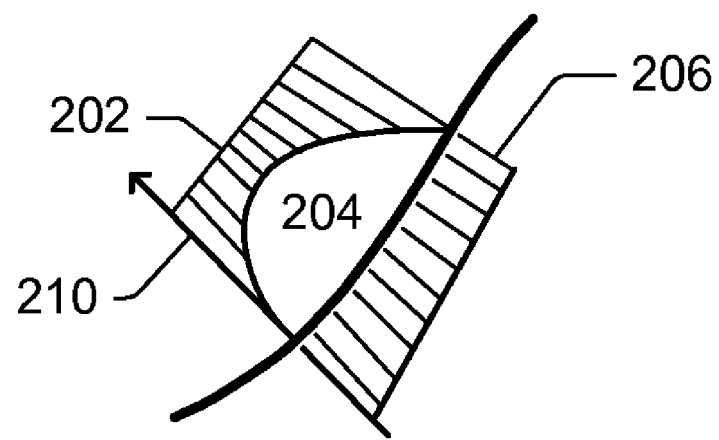

In the shallow water simulation system and method described herein, the height field in GSWE is constructed along surface normals rather than in the absolute gravity direction. This is illustrated in FIG. 2B. In this example, the height field is built in the direction of surface normal 210. When the surface is highly detailed with frequent normal variations, averaged surface normals from a low-resolution surface may be used to avoid self-intersection of water columns. In such embodiments, the difference between the original surface and the low-resolution surface may be represented as a terrain height field b(x) in the local background. The water height field may then be defined as a function h(x,t) of the surface position x and time t. Horizontal water velocity may be expressed as $\vec{u}(x,t)$, and vertical velocity may be implicitly given as ∂h/∂t. In such embodiments, instead of including the terrain height field directly into the calculations, the slope of the terrain height field may be included as an external force. In a water effect simulation, for example, drops on a curved surface may be treated as being normal to the surface, rather than along the gravity dimension.

As noted above, the shallow water simulation system and method described herein may allow simulations that include arbitrary external forces in additional to gravity. For example, a 3D force $\vec{f}_{ext}$ may be separated into a one-dimensional (1D) pressure component $P_{ext}$ and a 2D acceleration component $\vec{a}_{ext}$ as illustrated in FIG. 1. Although these two components act on the water based on different mechanisms, they both take effect by changing water's horizontal velocity $\vec{u}$. For example, the pressure component, which may include air pressure, surface tension pressure, and/or vertical gravity pressure, squeezes water and causes horizontal movement due to pressure difference. On the other hand, the acceleration component, which may include user control force and/or horizontal gravity acceleration, acts on the horizontal velocity immediately. By restricting the 3D Navier-Stokes equations to 2D surfaces, the non-viscid General Shallow Wave Equations, including these components, may be formulated as follows:

$$\vec{u}_t = -(\vec{u} \cdot \nabla)\vec{u} - \nabla P_{ext}/\rho + \vec{a}_{ext} \quad (1)$$

$$h_t + \nabla \cdot (h-b)\vec{u} = 0 \quad (2)$$

In these equations, ρ represents the water density. As shown above, equation 1 updates the horizontal velocity due to both $P_{ext}$ and $\vec{a}_{ext}$. Equation 2 updates the height field and maintains the incompressibility implicitly. Equation 2 may be reorganized into the following:

$$h_t + (h-b)\nabla \cdot \vec{u} + \vec{u} \cdot \nabla h = 0 \quad (3)$$

When targeting slowly moving water, the velocity term $(\vec{u} \cdot \nabla)\vec{u}$ in equation 1 may be ignored. According to the method of characteristics, the height field advection due to the velocity may be first solved using an explicit solver:

$$h_t + \vec{u} \cdot \nabla h = 0 \quad (4)$$

The rest of equations 1 and 3 may then be simplified by differentiating equation 3 with respect to t and equation 1 with respect to the spatial dimensions, and then eliminating cross-derivatives:

$$\frac{\partial^2 h}{\partial t^2} = \frac{d\Delta P_{ext}}{\rho} - d\nabla \cdot (\vec{a}_{ext}) \quad (5)$$

When external forces vary slowly through time, they may be treated as if they are temporally invariant. In such cases, equation 5 may be safely solved by explicit methods at each time step. For example, in some embodiments, user control forces may vary slowly enough to be solved in this way. However, two common natural forces, the gravity force and the surface tension force, are quite sensitive to height field changes over time. If explicit solvers are used in these cases, the system may require significantly smaller time steps (and thus significantly higher computational costs), in order to avoid instability, according to the Courant-Friedrichs-Lewy (CFL) condition. This condition states that a simulation time step should preferably be significantly less than the time for significant actions to occur, and is regarded as necessary, but not sufficient, for stability. Therefore, implicit schemes may be provided instead for both of these forces, as described below. In some embodiments, these implicit schemes may be combined and solved together in a single matrix system:

$$(A_g + A_s + I)h^t = \beta \quad (6)$$

In this equation, $h^t$ is the unknown height field at time t, and the previous height fields $h^{t-1}, h^{t-2}, \ldots$ at times t−1, t−2, ... are already known. By usual convention, I, in this equation, is the identity matrix, which includes values of "1" along the diagonal, and values of "0" elsewhere. Matrices $A_g$ and $A_s$ may be formulated from implicit schemes for gravity and surface tension, respectively. In this equation, β represents the prospective height field augmented with artificial viscosity effects by a factor τ:

$$\beta = h^{t-1} + (1-\tau)(h^{t-1} - h^{t-2}) \quad (7)$$

In some embodiments, after the height field has been solved, the velocity field may be updated using equation 1 and the surface friction may be applied by a damping factor $$\frac{h(x)}{h(x) + d}.$$

Note that when d is zero, there is no friction and as d increases, the friction effect becomes more obvious.

Boundary Conditions

When simulating large bodies of water with no dry areas, various embodiments may use Dirichlet boundary conditions (which allow the boundaries between water and undefined regions to absorb water waves) and/or Neumann boundary conditions (which allow them to reflect waves). When simulating water drops that are sparsely distributed on surfaces, the system may not define the height field in dry regions in order to save on memory and computational cost, in some embodiments. However, unlike undefined regions for large bodies of water, these dry regions are dynamic and may need to be updated as long as the water flows. In some embodiments, dry regions may be recognized as cells with non-positive heights. However, in order to avoid grid artifacts, in some embodiments the system may define boundary cells with negative heights immediately next to water cells so that a more accurate boundary may be estimated through interpolation. In such embodiments, boundary cells may only exchange water with neighboring water cells when the GSWE is solved in defined regions, including both boundary cells and water cells. The boundary conditions may be applied between boundary cells and water cells, where the actual boundary is specified. As noted above, the boundary conditions may include Neumann conditions, which may prevent water from entering that boundary, and/or Dirichlet conditions, which may allow water to move freely.

In some embodiments, after the height field has been updated, boundary cells may be removed from defined regions if they are no longer next to water cells. When a boundary cell becomes a water cell, its neighborhood may contain new boundary cells as well. Boundary oscillation may be caused by a surface discontinuity if new boundary cells are not initialized with proper height values. In some embodiments, the system may initialize new boundary cells with $C^1$ continuity, which may be sufficient in most cases.

Implicit Gravity Scheme

As previously noted, in the system and method described herein, the height field is built along surface normals rather than in the gravity direction. Thus, the gravity force may be separated into two components (vertical and horizontal) as discussed above:

$$P_g(X_i) = \rho g_i h_i$$

$$\vec{a}_g(X_i) = \vec{g} - g_i N_i \quad (8)$$

In these equations, $g_i$ represents the vertical gravity acceleration at $X_i$, which may be represented as $g_i = -\vec{g} \cdot N_i$. Since $P_g$ depends on the height field, an implicit scheme may be used for greater stability. In one embodiment, the implicit gravity scheme is extended from *Kass and Miller* 1990 (referenced above) by applying a different gravity acceleration $g_i$ at each position $X_i$. Given a 1D height field $h = \{h_1, h_2, \ldots h_n\}$ from $X_1$ to $X_n$, treating $P_g$ as $P_{ext}$ in equation 5 and differentiating $h_i'$ using finite differencing in the spatial domain yields the implicit matrix $A_g$ as the coefficients for $h'$ in the system equation 6:

$$a_{i,i} = \frac{1}{4\Delta x^2}[(d_i + d_{i+1})(g_i + g_{i+1}) + (d_i + d_{i-1})(g_i + g_{i-1})] \quad (9)$$

$$a_{i,i+1} = a_{i+1,i} = -\frac{1}{4\Delta x^2}(d_i + d_{i+1})(g_i + g_{i+1})$$

Similarly, the matrix for curved surfaces using the differential geometry scheme may be given as:

$$a_{i,i} = \frac{1}{8A}\sum_j w_{i,j}(d_i + d_j)(g_i + g_j) \quad (10)$$

$$a_{i,j} = a_{j,i} = -\frac{1}{8A}w_{i,j}(d_i + d_j)(g_i + g_j)$$

In some embodiments, the sample surface area A may be assumed to be uniform for all particles, after the solid surface has been uniformly sampled by the particle repulsion algorithm.

Implicit Surface Tension Scheme

According to Laplace's law, surface tension pressure $P_{surf}$ is related to surface mean curvature K. This dependency of surface tension on curvature may contribute to an unstable situation if using an explicit scheme, therefore the system and method described herein uses an implicit formulation for surface tension pressure. In some embodiments, surface tension pressure may be estimated using the Laplace-Beltrami operator:

$$P_{surf}(H_i) = \gamma \cdot K_i \quad (11)$$

$$K_i = \frac{1}{2A}\left|\sum_j \hat{w}_{i,j}(H_j - H_i)\right|$$

$$H_i = X_i + h_i N_i$$

Figure 3:
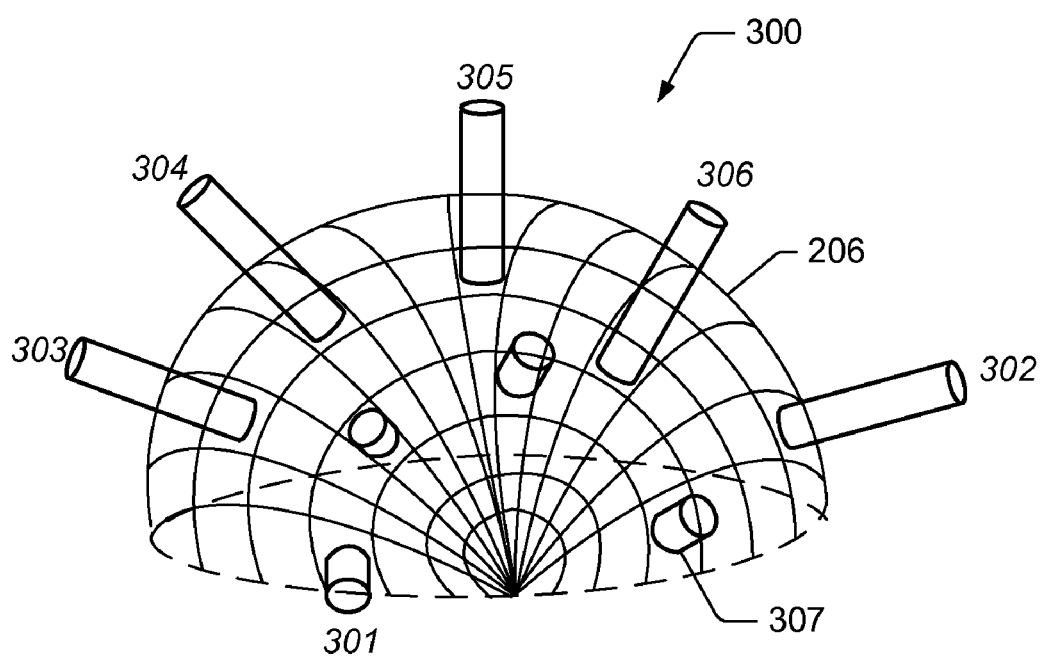
FIG. 3 illustrates a three-dimensional representation of height columns constructed along surface normals, according to one embodiment.

In these equations, $\gamma$ represents the surface tension coefficient, and $H_i$ represents the water surface extended along surface normal $N_i$ at position $X_i$. For example, FIG. 3 illustrates a three-dimensional representation 300 of several height columns $H_i$ (including columns 301-307) constructed at different positions $X_i$ normal to a curved solid surface 206. In some embodiments, it may be assumed that $N_i$ is locally constant after the solid surface has been densely sampled. It may also be assumed that the weight factor $\hat{w}_{i,j}$ on water surfaces is close to the weight factor $w_{i,j}$ on solid surfaces under the shallow wave assumptions. Since the repulsion force goes to zero after sampling, equation 11 may be simplified to:

$$K_i = \frac{1}{2A}\left|\sum_j w_{i,j}(X_j - X_i) + \sum_j w_{i,j}(h_j N_j - h_i N_i)\right| \quad (12)$$

$$= \frac{|N_i|}{2A}\sum_j w_{i,j}(h_j - h_i)$$

$$= \frac{1}{2A}\sum_j w_{i,j}(h_j - h_i)$$

Note that the Laplace-Beltrami operator on a curved surface is a generalized version of the Laplacian on a flat surface. This operator is naturally normalized since the sum of all contributions from a particle node $X_i$ is zero from equation 12.

In some embodiments, formulating an implicit scheme for surface tension from equations 11 and 12 may involve discretizing h completely. For flat surfaces, the Laplacian of the height field gives surface tension pressure, which may again be processed by the Laplacian in equation 5. The matrix $A_s$ for flat surfaces may then have cell kernels that take the form:

$$\begin{pmatrix} & & 1 & & \\ & 2 & -8 & 2 & \\ 1 & -8 & 20 & -8 & 1 \\ & 2 & -8 & 2 & \\ & & 1 & & \end{pmatrix} \quad (13)$$

In some embodiments, a more complicated matrix formula for curved surfaces may also be provided. Although this complete implicit scheme may be numerically stable, its matrix is not straightforward, symmetric or sparse like that of the gravity scheme, because the Laplacian of the Laplacian spans more than a 1-ring neighborhood. Fortunately, it can be seen from equation 13 that cells beyond a 1-ring neighborhood have much less influence than those in the 1-ring neighborhood. Therefore, another incomplete implicit scheme may be provided by only formulating implicit correlations within a 1-ring neighborhood after applying $P_{surf}$ in equation 11 into the system equation 5:

$$a_{i,i} = \frac{\gamma}{4\rho A^2} \sum_j w_{i,j}^2 (d_i + d_j) \quad (14)$$

$$a_{i,j} = -\frac{\gamma}{4\rho A^2} \sum_j w_{i,j}^2 (d_i + d_j)$$

Using this example, redundant correlations $b_s$ may be added to vector b as:

$$b_s(i) = -\frac{\gamma}{8\rho A^2} \left\{ B_i^{t-1} + 2\sum_j w_{i,j}^2 (d_i + d_j)(h_j^{t-1} - h_i^{t-1}) \right\} \quad (15)$$

$$B_i^{t-1} = \sum_j w_{i,j}(d_i + d_j)(K_j^{t-1} - K_i^{t-1})$$

$$K_i^{t-1} = \sum_j w_{i,j}(h_j^{t-1} - h_i^{t-1})$$

In some embodiments, the incomplete scheme may be more efficient. Note that the incomplete surface tension scheme was used for all of the example simulations described below unless explicitly indicated otherwise.

Drops: Surface Tension and Contact Angles

Figure 4:
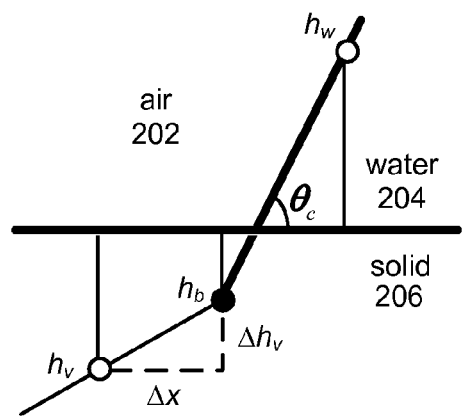
FIG. 4 illustrates construction of a point on a virtual surface, according to one embodiment.

Two factors that contribute to the shapes and motions of water drops are: surface tension forces at the air/water interface, and the effect of the hydrophilicity of the surface on which drops are forming. To account for surface tension forces at the air/water interface, in some embodiments surface tension pressures may be applied to both the water cells and the boundary cells as discussed above. To account for hydrophilicity, in some embodiments a virtual surface method may be used to produce water drops with various contact conditions. For a description of such a virtual surface method, see, e.g., Wang, H., Mucha, P. J., and Turk, G., "Water Drops on Surfaces" *Proc. of ACM SIGGRAPH* 2005, 921-929, which is hereby incorporated by reference in its entirety. The explicit method described therein was used to calculate surface tension on the contact line between the solid surface and the liquid surface. The paper also describes that curvature forces are computed using volume grids to represent the surface shape. By using a height field formulation instead, a much faster implicit scheme may be used, as described herein. The use of contact conditions may allow simulation of hydrophobic surfaces (those on which drops will bead up), and hydrophilic surfaces (those on which drops are flattened). Although the actual boundary (also called the contact front) is between boundary cells and water cells, some embodiments may simply treat boundary cells as exact contact fronts and apply boundary surface tension pressures only to them. In embodiments employing a height field formulation, the surface shape may match the fluid height field in wet areas, but may be the extrapolated shape into the interior of the solid at the boundaries with the dry areas. These characteristics may be considered boundary conditions to the surface tension matrix $A_s$, described herein. The 1D case is illustrated in FIG. 4. In this example, a virtual surface cell $h_v$ corresponds to a point $h_w$ on the surface of water 204. Since surface tension may be estimated as a weighted difference, as in equation 12, the virtual surface may be interpreted as a height difference between boundary cell $h_b$ and virtual surface cell $h_v$:

$$\Delta h_v = h_b - h_v = \Delta x \tan \theta_c \quad (16)$$

In this equation, $\theta_c$ represents the contact angle. For a 2D regular grid, an angular factor $\alpha$ may be incorporated to account for the fact that the boundary normal is not aligned with the grid axis:

$$\Delta h_v = \alpha \Delta x \tan \theta_c \quad (17)$$

$$\alpha = \begin{cases} N_{bx} + N_{by}, & w_l + w_r + w_u + w_d = 1 \\ (w_l + w_r)N_{bx} + (w_u + w_d)N_{by}, & \text{otherwise} \end{cases}$$

Figure 5:
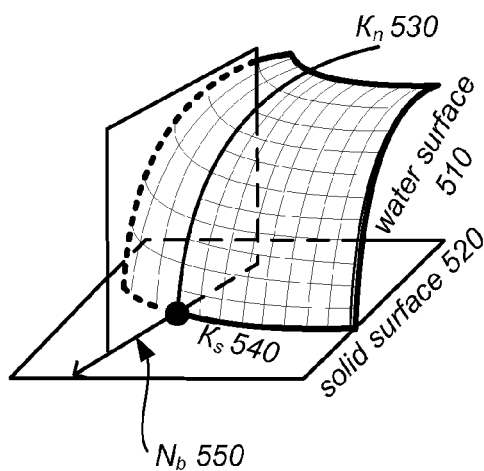
FIG. 5 illustrates a boundary between a water surface and a solid surface, and the boundary's contact normal line, according to one embodiment.
Figure 6A:
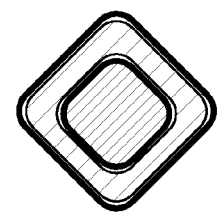
FIGS. 6A and 6B illustrate two different water drop shapes, according to different embodiments.
Figure 6B:
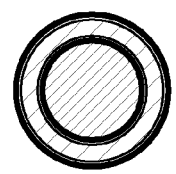

In this equation, $w_l$, $w_r$, $w_u$ and $w_d$ are 1 if left, right, up or down neighbor cells are in defined regions, otherwise they are 0. In this equation, $N_{bx}$ and $N_{by}$ represent the boundary's surface normal coordinates as shown in FIG. 5. In this example, the boundary's contact normal line 550 is described by the equation $N_b = (N_{bx}, N_{by})$. FIG. 6B illustrates a water drop correctly beads up into a circle when simulated using the angular factor; otherwise it might become a diamond shape, as in FIG. 6A. On curved surfaces, since the connectivity between height columns could be arbitrary, instead of finding a proper angular factor, the boundary mean curvature may be summed from two assumed principal components $\kappa_n$ (530) and $\kappa_s$ (540) as shown in FIG. 5. The depth component $\kappa_n$ (530) in the normal plane modulates how steep the surface is, which may in some embodiments be estimated similarly to the 1D case. The angular component $\kappa_s$ (540) in the horizontal plane measures the contact line curvature as:

$$\kappa_s = \sigma \sum_i \begin{cases} \varphi_i, & h_i - h_b > 0 \text{ and } h_{i+1} - h_b > 0 \\ \frac{(h_i - h_b)\varphi_i}{h_i - h_{i+1}}, & h_i - h_b > 0 \text{ and } h_{i+1} - h_b < 0 \\ \frac{(h_{i+1} - h_b)\varphi_i}{h_{i|1} - h_i}, & h_i - h_b > 0 \text{ and } h_{i+1} - h_b > 0 \end{cases} \quad (17)$$

In these equations, $\sigma$ represents a scalar factor to modulate the magnitude of $\kappa_s$ and $\phi_i$ represents the angle between two neighboring edges. A wetting map may be maintained from water paths and the contact angle may be chosen based on the surface wetness, in some embodiments.

Figure 7A:
FIGS. 7A-7D illustrate screenshots from a shallow water simulator, according to various embodiments.
Figure 7B:
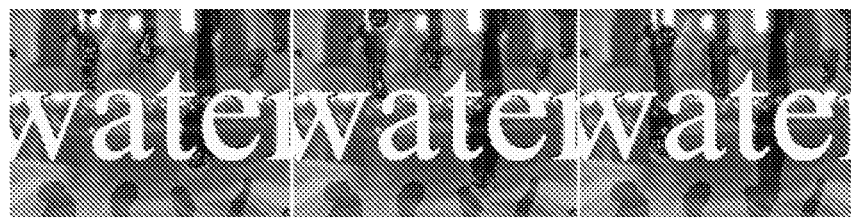

Several examples of the use of the system and method described herein are illustrated in FIGS. 7A-7D. FIG. 7A illustrates simulation of water drops on a glass. This simulation involves fluid movement on a curved surface, which may be simulated as described herein using a height field built along surface normals. FIG. 7B illustrates three frames of a simulation of water drops flowing on a window panel with a white waterproof boundary. This simulation may in some embodiments use a regular grid, as described above.

Interactive Fluid Control

Figure 7C:

Since, in some embodiments, the system and method described herein has little restriction on external forces, fluid shapes may be interactively controlled by specifying various external control forces. Two techniques may be provided in various embodiments to implement such external control forces $\vec{f}_{ext}$. The first method uses external pressures calculated from distance maps. For example, FIG. 7C is a screen shot of a simulation involving user control of fluid shapes using pressure control, where the pressure may be used to modify the value of gravity locally. In this example, the pressure field uses the Euclidean distance to a target fluid shape. In other words, if control pressures are expressed as gravity pressures and the control pressure field as a terrain height field in the background, control shapes are analogous to terrain valleys and the water flows from peaks to valleys. Because distance maps are $C^1$ continuous (i.e., their derivatives are continuous) in most places, those control forces, defined as the gradient of the pressure field, may be smooth and continuous in most places as well. This method may in some embodiments be comparatively stable and robust. In various embodiments, this method may execute faster when the target shape is static than when it is dynamic, since reconstructing the distance field may be computationally expensive.

Figure 7D:
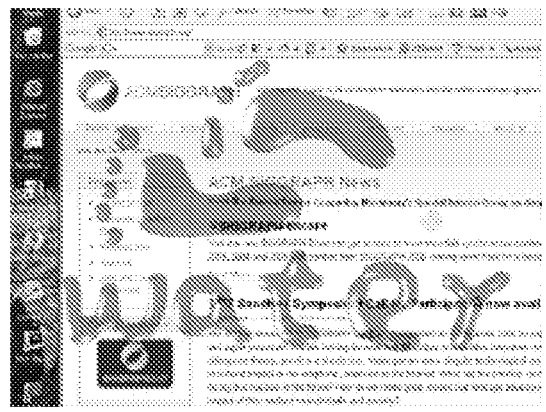

Instead of constructing a pressure field, the second method modifies the fluid velocity directly by external accelerations. In some embodiments, these accelerations may be created from cursor motions, similar to those used in some digital painting tools. The magnitude of these synthetic accelerations may in some embodiments be clamped in order to prevent instability caused by arbitrary user inputs. FIG. 7D is a screenshot captured from one embodiment of an interactive shape design system. In this example, fluid shape is controlled by external accelerations due to the motion of a user's cursor to "paint" footprints and the word "water" on the screen overlaying an existing image.

Matrix Solver and Data Structure

The system and method may take advantage of the surface mesh connectivity to store the sparse GSWE matrices. Diagonal elements may be stored at vertices, and off-diagonal elements may be stored at mesh edges between each vertex and its 1-ring neighbors. Directional edges may be used when the matrix is not symmetric. Hyper edges may also be created that form connections between vertices and their 2-ring neighborhoods in order to store the matrix required by the complete surface tension scheme. To solve the symmetric positive definite matrix system defined by the implicit gravity scheme and the incomplete surface tension scheme, the preconditioned conjugate gradient method may be used with either a Jacobi preconditioner or a modified incomplete Cholesky decomposition preconditioner. In some embodiments, the preconditioned Bi-Conjugate Gradient Stabilized method (Bi-CG-STAB) with modified incomplete LU decomposition may be implemented to test the complete surface tension scheme. The matrix solver for 2D regular grid applications may also be implemented with a GPU version with a Jacobi preconditioner, in order to improve the performance as Table 1 shows. Similarly, the system and method may be extended to a GPU matrix solver for curved surfaces. Where available, simulation speeds are listed for both CPU and GPU solvers.

The above-described system and method for shallow water simulation may be implemented as program instructions executable on a computer system. Either CPU or GPU implementations may be provided. Test statistics are listed in Table 1 for the example simulations illustrated in FIGS. 7A-7D. Real-world units and parameters are used, including the water density $\rho$, which is $1.0 \times 10^3$ kg/m$^3$ at 3.98° C. The frame rate for each example is measured in the worst case with maximum simulation burden. Table 1 shows that the CPU solver may take advantage of sparse water, as in the Window examples with water drops. Compared with particle systems or grid systems that usually require several minutes to generate a single frame under similar resolution, applications using the system and method described herein may run at interactive rates and some of them may run in real time. Compared with previous height field systems, the present system and method may have a slightly higher computational cost in some embodiments for several reasons. First, the overhead to handle a general system may be small but not negligible. Second, more iterations may be needed to solve the matrix system with a surface tension matrix $A_s$, especially when the surface tension coefficient $\gamma$ is large.

When gravity is in the same direction as the surface normal, the gravity pressure component $g_i$ in equation 8 above becomes negative, which causes a less diagonally dominant matrix as well. Eventually, with sufficiently strong gravity, it can no longer be guaranteed for the matrix to be positive definite and its solution may become unpredictable, in some embodiments. Since the influence of $A_g$ on the matrix system depends on the water depth, ideally redundant water may be removed from the height field in order to keep the system solvable. This scenario corresponds to water drops dripping from the bottom of a solid surface, after the amount of accumulated water goes above some threshold. Water drops in the INTERACTIVE example of FIG. 7D are more viscous and more sensitive to surface tension because the grid scale is reduced to about ⅛ of the other water drop examples.

GPU rendering may be provided with single reflection and refraction during online simulation for various applications. Some embodiments may be supported by offline GPU rendering with multi-sampling to remove aliasing artifacts. An offline photorealistic ray tracer may be used to produce high-quality videos for some embodiments.

A physically based framework has been described above to efficiently simulate 3D water flows on arbitrary surfaces. This framework is governed by the General Shallow Wave Equations (GSWE) and is based on a height field representation. Techniques within this framework may include an implicit gravity scheme and an implicit surface tension scheme. Experiments show that the system is fast, stable, and straightforward to implement on both CPUs and GPUs. The approach is flexible enough to produce multiple effects such as water

TABLE 1

| Simulation Name | Simulation Type | Resolution | Gravity g (m/s$^2$) | Surface Tension $\gamma$ | Viscosity $\tau$ | Simulation Speed (frames/sec) |
|---|---|---|---|---|---|---|
| Water Glass (FIG. 7A) | Curved Surface | 160,000 | 9.8 | 0.073 | 0.5 | CPU: 4.1 |
| Window (FIG. 7B) | Regular Grid | 400 × 400 | 9.8 | 0.073 | 0.3 | GPU: 9.2 CPU: 11.0 |
| SIGGRAPH (FIG. 7C) | Pressure Control | 400 × 400 | 9.8 | 0.073 | 0.3 | GPU: 4.2 CPU: 1.3 |
| Interactive (FIG. 7D) | Acceleration Control | 400 × 400 | 0 | 0.073 | 0.3 | CPU: 20 | waves, rivulets and streams, water drop effects, and interactive control and shape modeling.

In some embodiments, a solution that includes surface tension effects, as described herein, may allow realistic simulation of "painting" with water or watercolors. For example, a hierarchical basis preconditioner may be implemented for the 2D regular grid matrix solver, developing a GPU matrix solver for curved surfaces, and incorporating the algorithm into an interactive media painting system. Also, in some embodiments the height field techniques described herein may be combined with particle systems and grid systems so that non-height-field effects can be efficiently produced as well. Motion reduction of the height field by Principal Component Analysis may also be employed.

Note that while many of the examples described herein refer to simulations involving water, the system and methods may in other embodiments be applied to simulation of similar shallow wave effects in other fluids. For example, in one embodiment the system and methods may be applied to fluids of different viscosities by changing the values of various parameters, such as the fluid density $\rho$, and/or the artificial viscosity component $\tau$.

Figure 8:
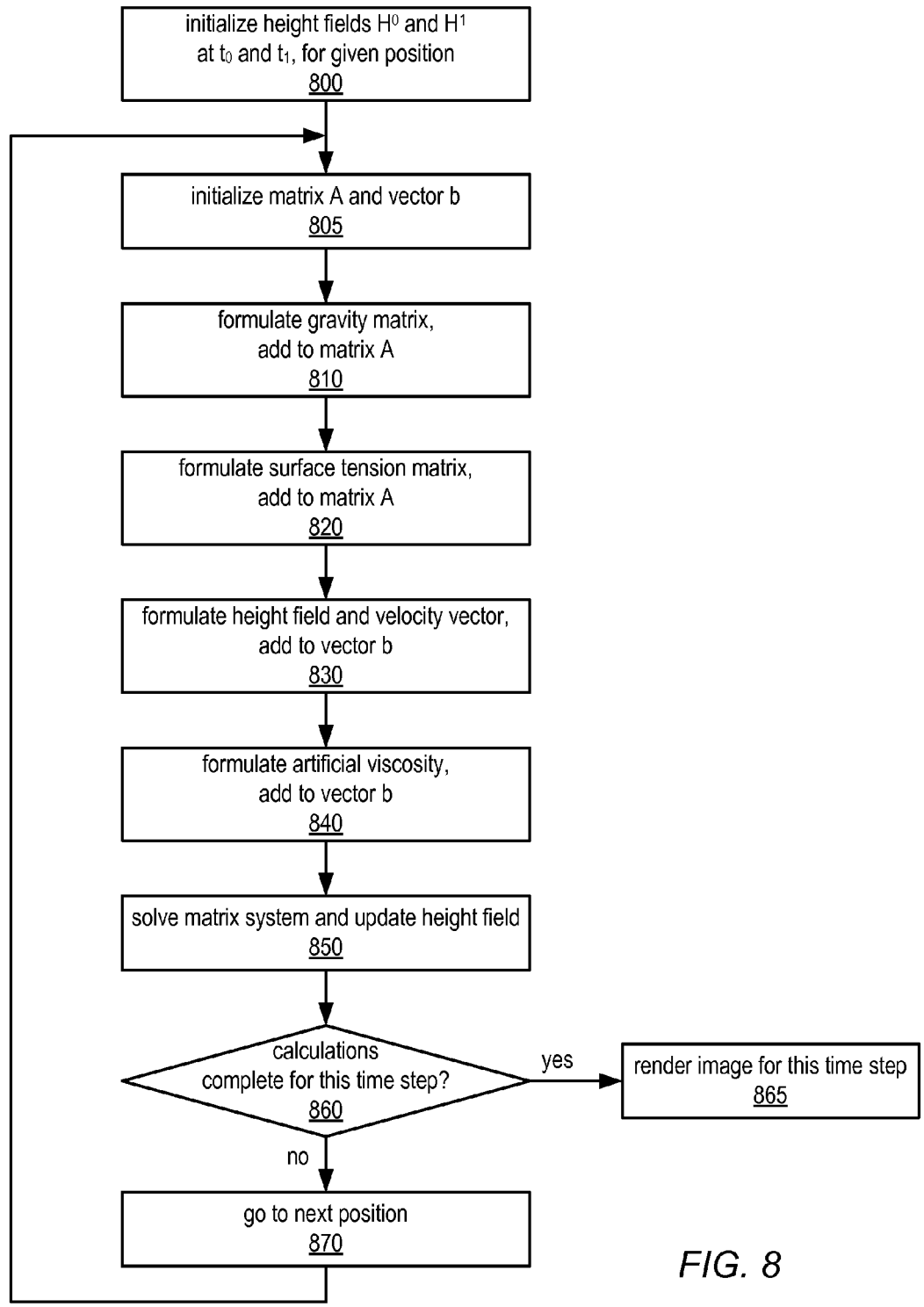
FIG. 8 is a flow chart illustrating a method for simulating shallow water effects, according to one embodiment.

The methods described herein for simulation of a shallow wave water effect are further illustrated by the flow chart in FIG. 8, according to one embodiment. In this example, the method may include initializing height fields $H^0$ and $H^1$ at $t_0$ and $t_1$ for a given position, as in 800. The method may also include initialization of a matrix system A and a vector b, as in 805. In this example, vector b may represent the velocity vector at the given position.

As described above, a matrix system for simulating shallow water effects may include an external gravity force component. Therefore, the method illustrated in FIG. 8 may include formulating a gravity matrix and adding it to matrix system A, as in 810. In one embodiment, this formulation may be described using the following pseudo code: A=A+Gravity_Matrix($H^{i-1}$, $H^{i-2}$), where the initial value of i is 2.

A matrix system for simulating shallow water effects may also include an external surface tension force component, as described above. Therefore, the method illustrated in FIG. 8 may include formulating a surface tension matrix and adding it to matrix system A, as in 820. In one embodiment, this surface tension matrix may be based on the Laplace-Beltrami operator, as described above. In one embodiment, this formulation may be described using the following pseudo code: A=A+Surface_Tension_Matrix($H^{i-1}$, $H^{i-2}$), where the initial value of i is 2.

As described above, the height field advection due to velocity may be formulated using an explicit semi-Lagrangian method. Therefore, the method illustrated in FIG. 8 may include formulating the height field and velocity vector, and adding this component to vector b, as in 830. In one embodiment, this formulation may be described using the following pseudo code: b=b+Semi_Lagrangian Solver($H^0$, $H^1$).

In some embodiments, the method may include formulating an artificial viscosity component $\tau$, and applying it to vector b, as described above. This is shown in FIG. 8 as 840, and may be described using the following pseudo code: b=b+Viscosity_Term($H^{i-1}$, $H^{i-2}$), where the initial value of i is 2.

In this example, the matrix system A and vector b may be solved using any of the methods described above, and the height field for this position and time step may be updated, as in 850. This may be described using the following pseudo code: $H^i$=Matrix_Solver(A, b). If there are more calculations to be performed for this time step (e.g., if the simulation includes other positions for which the height field has not yet been determined for this time step), the method may include incrementing i, and repeating these operations for the next position. This is illustrated as the negative exit from 860, 870, and the feedback loop to 805, in FIG. 8. If the calculations are complete for this time step, shown as the positive exit from 860, an image may be rendered for this time step using the determined height field, as in 865. Note that the operations illustrated in FIG. 8 may then be repeated as they are applied to additional time steps (not shown).

Figure 9:
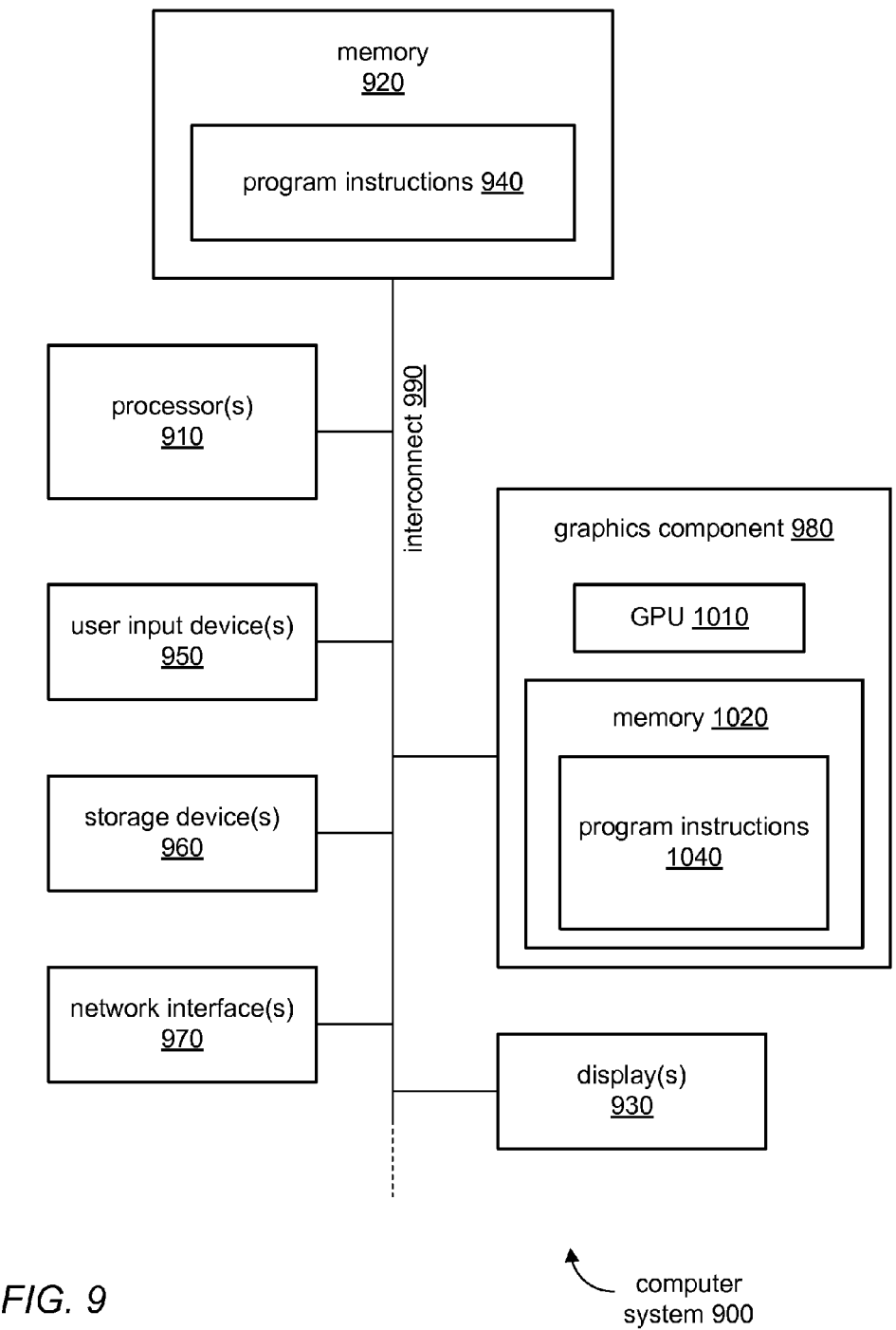
FIG. 9 illustrates a computer system suitable for implementing shallow water simulation, according to one embodiment.

FIG. 9 is a block diagram illustrating one embodiment of a computer system 900 suitable for implementing embodiments of the system and method disclosed herein for simulating shallow wave water effects. Computer system 900 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device. As illustrated in FIG. 9, computer system 900 may include one or more processors 910. Processors 910 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 900, such as various versions of Unix, Linux, Windows™ from Microsoft Corporation, MacOS™ from Apple Corporation, or any other operating system that enables the operation of software on a hardware platform.

As shown in FIG. 9, processor(s) 910 may be coupled to one or more of the other illustrated components by at least one communications bus, such as interconnect 990. In various embodiments, interconnect 990 may comprise, e.g., a system bus, LDT, PCI, ISA, or another communication bus type.

As illustrated in FIG. 9, computer system 900 may include one or more system memories 920 (e.g., one or more of cache, SRAM DRAM, RDRAM, EDO RAM, DDR RAM, SDRAM, Rambus RAM, EEPROM, or other types of RAM or ROM) coupled to other components of computer system 900 via interconnect 990. Memory 920 may include other types of memory as well, or combinations thereof. One or more of memories 920 may include program instructions 940 executable by one or more of processors 910 to implement aspects of the shallow water simulation techniques described herein. Program instructions 940 may be partly or fully resident within the memory 920 of computer system 900 at any point in time. Alternatively, program instructions 1040 (which may be included in a memory 1020 of a graphics component 980) may be provided to GPU 1010 for performing shallow water simulation on GPU 1010 using one or more of the techniques described herein. In some embodiments, the techniques described herein may be implemented by a combination of program instructions 940 and 1040 executed on one or more processors 910 and one or more GPUs 1010, respectively. As described above regarding memory 920, memory 1020 may be implemented using any appropriate medium such as any of various types of ROM, RAM, or other types of memory, or combinations thereof, in various embodiments. Program instructions 940 and/or 1040 may also be stored on a storage device 960 accessible from the processor(s) 910 and/or GPU 1010, in some embodiments. Any of a variety of storage devices 960 may be used to store the program instructions 940 and/or 1040 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices 960 may be coupled to the processor(s) 910 and/or GPU 1010 through one or more storage or I/O interfaces including, but not limited to, interconnect 990, as described above. In some embodiments, the program instructions 940 and/or 1040 may be provided to the computer system 900 via any suitable computer-readable storage medium including memory 920, memory 1020, and/or storage devices 960 described above.

Program instructions 940 and/or 1040 may be implemented in various embodiments using any desired programming language, scripting language, or combination of programming languages and/or scripting languages, e.g., C, C++, C#, Java™, Perl, etc. In some embodiments, program instructions 1040 may be implemented using specific graphic languages specifically for developing programs executed by specialized graphics hardware, such as GPU 1010. In addition, program instructions 1040 may be embodied on memory specifically allocated for use by GPU 1010, such as memory on a graphics component 980 that includes GPU 1010. Thus, memory 1020 may represent dedicated graphics memory and/or general-purpose system memory, in various embodiments. Memory 920 and/or memory 1020 may in some embodiments also include a data store configured to store image data for one or more input images and/or output images, in various embodiments. Other information not described herein may be included in memory 920 and/or memory 1020 and may be used to implement the methods described herein and/or other functionality of computer system 900.

As noted above, GPU 1010 may be included in a specialized graphics card or other graphics component 980 which is coupled to the processor(s) 910 via interconnect 990. For example, GPU 1010 may in various embodiments be a dedicated graphics-rendering device for a personal computer, workstation, game console or any other computer system 900. Modern GPUs may be very efficient at manipulating and displaying computer graphics and their highly parallel structure may make them more effective than general-purpose CPUs for a range of complex graphical algorithms. For example, graphics processor 1010 may implement a number of graphics primitive operations in a way that makes executing them much faster than drawing directly to the screen with a host CPU, such as processor 910. In various embodiments, the methods disclosed herein for simulating shallow water effects may be implemented at least in part by program instructions configured for parallel execution on two or more such GPUs.

GPUs, such as GPU 1010 may be implemented in a number of different physical forms. For example, graphics component 980 and/or GPU 1010 may take the form of a dedicated graphics card, an integrated graphics solution and/or a hybrid solution. Graphics component 980 and/or GPU 1010 may interface with the motherboard of a computer system 900 by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface a motherboard in a standard fashion. The term "dedicated" refers to the fact that hardware graphics solution may have RAM that is dedicated for graphics use, not to whether the graphics solution is removable or replaceable.

Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 9, memory 1020 may represent any of various types and arrangements of memory, including general-purpose system memory and/or dedicated graphics or video memory.

Integrated graphics solutions, or shared graphics solutions are graphics processors that utilize a portion of a computer's system memory rather than dedicated graphics memory. For instance, modern desktop motherboards normally include an integrated graphics solution and have expansion slots available to add a dedicated graphics card later. As programs executed on a GPU 1010 may be extremely memory intensive, an integrated solution may find itself competing for system RAM (e.g., memory 920) with processor(s) 910 as the integrated solution may have no dedicated video memory. For instance, memory 920 may experience a bandwidth between 2 GB/s and 8 GB/s, while dedicated GPUs typically enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between GPU 1010 and the rest of a computer system 900 may travel through a graphics card slot or other interface, such as interconnect 990 of FIG. 9.

Computer system 900 may also include one or more additional I/O interfaces, such as interfaces for one or more user input devices 950. For example, computer system 900 may include interfaces to a keyboard, a mouse or other cursor control device, a joystick, or other user input devices 950, in various embodiments. Additionally, the computer system 900 may include one or more displays 930, coupled to processors 910 and/or other components via interconnect 990. In one embodiment, the display(s) 930 may be coupled directly to the graphics component 980 for display of data provided by the graphics component 980 (not shown). It will be apparent to those having ordinary skill in the art that computer system 900 may also include numerous elements not shown in FIG. 9, as illustrated by the ellipsis shown.

As illustrated in FIG. 9, computer system 900 may include one or more network interfaces 970 providing access to a network. Processor(s) 910, the network interface 970, and other components may be coupled to each other via interconnect 990. Network interface(s) 970 may be configured to enable computer system 900 to communicate with other computers, systems or machines, such as across a network, as described above. Network interface(s) 970 may use standard communications technologies and/or protocols. Network interface(s) 970 may utilize links employing technologies such as Ethernet, 802.11, integrated services digital network (ISDN), digital subscriber line (DSL), and asynchronous transfer mode (ATM) as well as other communications technologies. Similarly, the networking protocols used on a network to which computer system 900 may be connected via network interface(s) 970 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over various network(s) by network interface(s) 970 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above. It should be noted that one or more components of the computer system 900 may be located remotely and accessed over the network (e.g., via one or more network interfaces 970).

Note that program instructions 940 and/or 1040 may be configured to implement a shallow water simulator as a stand-alone application, or as a module of another graphics application or graphics library, in various embodiments. For example, in one embodiment program instructions 940 may be configured to implement graphics applications such as painting, publishing, photography, games, animation, and/or other applications, and may be configured to simulate shallow water effects as part of one or more of these graphics applications. In another embodiment, program instructions 1040 may be configured to implement the shallow water simulation techniques described herein in one or more functions called by another graphics application executed on GPU 1010 and/or processor(s) 910. Program instructions 940 and/or 1040 may also be configured to render images and present them on one or more displays 930 as the output of a shallow water simulator and/or to store rendered image data in memory 920, memory 1020, and/or storage device(s) 960, in various embodiments. For example, a graphics application included in program instructions 1040 may utilize GPU 1010 when rendering or displaying images in some embodiments.

The shallow water simulator described herein may be provided as a computer program product, or software, that may include a computer-readable storage medium having stored thereon instructions, which may be used to program a computer system (or other electronic devices) to implement the methods described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

While systems and methods for implementing a shallow water simulator have been described herein with reference to various embodiments, it will be understood that these embodiments are illustrative and that the scope of the present invention is not limited to them. Many variations, modifications, additions, and improvements are possible. More generally, the present invention is described in the context of particular embodiments. For example, the blocks and logic units identified in the description are for ease of understanding and not meant to limit the invention to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system, comprising:
one or more processors; and
a memory coupled to the one or more processors and storing program instructions executable by the one or more processors to implement a shallow water simulator;
wherein the shallow water simulator is configured to simulate a three-dimensional fluid effect on a surface using a height field representation comprising height columns normal to the surface;
wherein the shallow water simulator is further configured to construct one or more of the height columns normal to the surface in a direction other than that of a gravity field for the three-dimensional fluid effect.

2. The system as recited in claim 1, wherein to simulate the three-dimensional fluid effect, the shallow water simulator is configured to solve a set of shallow wave equations restricted to two dimensions.

3. The system as recited in claim 1, wherein to simulate the three-dimensional fluid effect, the shallow water simulator is configured to solve for one or more external forces applied to the three-dimensional fluid effect, wherein the one or more external forces include one or more of: gravity and surface tension.

4. The system as recited in claim 3, wherein to solve for the one or more external forces, the shallow water simulator is configured to solve for the one or more external forces using an implicit scheme.

5. The system as recited in claim 3, wherein to solve for the one or more external forces, the shallow water simulator is configured to separate at least one of the one or more external forces into a pressure component and an acceleration component, and to solve for effects of both the pressure component and the acceleration component on the three-dimensional fluid effect.

6. The system as recited in claim 5, wherein the one or more external forces comprise gravity, and wherein to solve for the one or more external forces, the shallow water simulator is further configured to apply a different value for a gravity acceleration component at each position of the three-dimensional fluid effect.

7. The system as recited in claim 5, wherein the shallow water simulator is configured to solve for the effects of the acceleration component using an explicit scheme to solve for height field advection.

8. The system as recited in claim 3, wherein the one or more external forces comprise surface tension, and wherein to solve for the one or more external forces, the shallow water simulator is further configured to apply surface tension pressures to both fluid cells and boundary cells of the three-dimensional fluid effect.

9. The system as recited in claim 3, wherein the one or more external forces comprise surface tension, and wherein to solve for the one or more external forces, the shallow water simulator is further configured to use a virtual surface method dependent on a contact angle at a boundary between the fluid and the surface.

10. The system as recited in claim 1, wherein the height field representation is dependent on a condition of boundary cells immediately adjacent to fluid cells.

11. The system as recited in claim 1, wherein the shallow water simulator is further configured to construct the height columns dependent on an artificial viscosity effect.

12. The system as recited in claim 1, wherein the shallow water simulator is further configured to generate image data for displaying the three-dimensional fluid effect.

13. The system as recited in claim 12, wherein the shallow water simulator is configured to generate the image data for displaying the three-dimensional fluid effect in real time.

14. The system as recited in claim 12, wherein the shallow water simulator is configured to generate the image data for displaying the three-dimensional fluid effect in response to interactive user control of the three-dimensional fluid effect.

15. The system as recited in claim 1, wherein the three-dimensional fluid effect includes one or more of: waves, rivulets, streams, drops, and capillary events.

16. The system as recited in claim 1, wherein the one or more processors comprise at least one of: a general-purpose central processing unit (CPU) and a graphics processing unit (GPU).

17. A computer-readable storage medium, comprising program instructions computer-executable to implement a shallow water simulator configured to simulate a three-dimensional fluid effect on a surface;
wherein to simulate the three-dimensional fluid effect, the shallow water simulator is configured to solve for one or more external forces applied to the three-dimensional fluid effect, wherein the one or more external forces include one or more of: gravity and surface tension; and
wherein to simulate the three-dimensional fluid effect, the shallow water simulator is further configured to construct a height field representation comprising height columns normal to the surface; and
wherein the shallow water simulator is further configured to construct one or more of the height columns normal to the surface in a direction other than that of a gravity field for the three-dimensional fluid effect.

18. The storage medium as recited in claim 17, wherein to solve for the one or more external forces, the shallow water simulator is configured to solve for the one or more external forces using an implicit scheme.

19. The storage medium as recited in claim 17, wherein to solve for the one or more external forces, the shallow water simulator is configured to separate at least one of the one or more external forces into a pressure component and an acceleration component, and to solve for effects of both the pressure component and the acceleration component on the three-dimensional fluid effect.

20. The storage medium as recited in claim 17, wherein the height field representation is dependent on one or more of: a condition of boundary cells immediately adjacent to fluid cells and an artificial viscosity effect.

21. The storage medium as recited in claim 17, wherein to simulate the three-dimensional fluid effect, the shallow water simulator is configured to solve a set of shallow wave equations restricted to two dimensions.

22. The storage medium as recited in claim 17, wherein the shallow water simulator is further configured to generate image data for displaying the three-dimensional fluid effect.

23. The storage medium as recited in claim 22, wherein the shallow water simulator is configured to generate the image data for displaying the three-dimensional fluid effect in response to interactive user control of the three-dimensional fluid effect.

24. A computer-implemented method for simulating a three-dimensional fluid effect on a surface, comprising:
constructing a height field representation comprising height columns normal to the surface, wherein one or more of the height columns normal to the surface are constructed in a direction other than that of a gravity field for the three-dimensional fluid effect;
simulating, using the processor, the three-dimensional fluid effect on the surface using the height field representation comprising height columns normal to the surface; and
generating image data for displaying the three-dimensional fluid effect.

25. The method as recited in claim 24, further comprising solving a set of shallow wave equations restricted to two-dimensions to simulate the three-dimensional fluid effect.

26. The method as recited in claim 24, further comprising solving for one or more external forces applied to the three-dimensional fluid effect, wherein the one or more external forces include one or more of: gravity and surface tension.

27. The method as recited in claim 26, wherein said solving for one or more external forces, comprises solving for the one or more external forces using an implicit scheme.

28. The method as recited in claim 26, wherein said solving for one or more external forces, comprises:
separating at least one of the one or more external forces into a pressure component and an acceleration component; and
solving for effects of both the pressure component and the acceleration component on the three-dimensional fluid effect.

29. The method as recited in claim 24, wherein the height field representation is dependent on one or more of: a condition of boundary cells immediately adjacent to fluid cells and an artificial viscosity effect.

30. The method as recited in claim 24, further comprising receiving user input for interactive control of the three-dimensional fluid effect; wherein said generating image data for displaying the three-dimensional fluid effect is performed in response to said receiving.

* * * * *